United States Patent
Linderman et al.

(10) Patent No.: US 9,141,877 B2
(45) Date of Patent: Sep. 22, 2015

(54) METHOD FOR CONTEXT AWARE TEXT RECOGNITION

(71) Applicants: Richard Linderman, Rome, NY (US); Oinru Qiu, Manlius, NY (US); Qing Wu, Manlius, NY (US)

(72) Inventors: Richard Linderman, Rome, NY (US); Oinru Qiu, Manlius, NY (US); Qing Wu, Manlius, NY (US)

(73) Assignee: The United States of America as represented by the Secretary of the Air Force, Washington, DC (US)

( * ) Notice: Subject to any disclaimer, the term of this patent is extended or adjusted under 35 U.S.C. 154(b) by 399 days.

(21) Appl. No.: 13/573,899

(22) Filed: Dec. 17, 2012

(65) Prior Publication Data

US 2013/0188863 A1 Jul. 25, 2013

Related U.S. Application Data

(60) Provisional application No. 61/633,995, filed on Jan. 25, 2012.

(51) Int. Cl.
G06K 9/62 (2006.01)
G06K 9/64 (2006.01)
G06K 9/72 (2006.01)

(52) U.S. Cl.
CPC .. *G06K 9/62* (2013.01); *G06K 9/64* (2013.01); *G06K 9/723* (2013.01); *G06K 2209/01* (2013.01)

(58) Field of Classification Search
None
See application file for complete search history.

(56) References Cited

U.S. PATENT DOCUMENTS

| | | | | |
|---|---|---|---|---|
| 6,243,480 | B1 * | 6/2001 | Zhao et al. | 382/100 |
| 6,487,301 | B1 * | 11/2002 | Zhao | 382/100 |
| 7,106,884 | B2 * | 9/2006 | Tamaru | 382/100 |
| 2002/0122568 | A1 * | 9/2002 | Zhao | 382/100 |
| 2003/0149936 | A1 * | 8/2003 | Tamaru | 715/515 |

OTHER PUBLICATIONS

Unified Perception—Platform, Qiu et al., IEEE, 978-1-4244-9637-2, Jul. 31-Aug. 5, 2011, pp. 1714 to 1721.*

* cited by examiner

*Primary Examiner* — Jayesh A Patel
(74) *Attorney, Agent, or Firm* — Joseph A Mancini

(57) ABSTRACT

A method for context-aware text recognition employing two neuromorphic computing models, auto-associative neural network and cogent confabulation. The neural network model performs the character recognition from input image and produces one or more candidates for each character in the text image input. The confabulation models perform the context-aware text extraction and completion, based on the character recognition outputs and the word and sentence knowledge bases.

16 Claims, 4 Drawing Sheets

METHOD FOR CONTEXT AWARE TEXT RECOGNITION

PRIORITY CLAIM UNDER 35 U.S.C. §119(e)

This patent application claims the priority benefit of the filing date of provisional application Ser. No. 61/633,995, having been filed in the United States Patent and Trademark Office on Jan. 25, 2012 and now incorporated by reference herein.

STATEMENT OF GOVERNMENT INTEREST

The invention described herein may be manufactured and used by or for the Government for governmental purposes without the payment of any royalty thereon.

BACKGROUND OF THE INVENTION

1. Field of the Invention

The present invention relates generally to optical character recognition (OCR) within the word and sentence contexts of the character. More particularly, the invention relates to a method of text recognition based on both the input image patterns using an auto-associative neural network model, and the contexts of words and sentences using the cogent confabulation model.

2. Description of the Background Art

Military planning, battlefield situation awareness, and strategic reasoning rely heavily on the knowledge of the local situation and the understanding of different cultures. A rich source of such knowledge is presented as natural language text. In 2009, DARPA launched the Machine Reading program to develop a universal text-to-knowledge engine that scavenges digitized text to generate knowledge that can be managed by artificial intelligence reasoning systems. The Machine Reading program limited its scope to text available on the World Wide Web. In real life, text exists in many forms other than ASCII representation. These include printed texts such as books, newspapers and bulletins, as well as hand written texts. There are many occasions when only the scanned or photographed image of the texts is available for computer processing. While machine reading systems bridge the gap between natural language and artificial intelligence, another bridge has to be constructed to link the natural state of texts to a unique encoding that can be understood by computers.

Prior art conventional Optical Character Recognition (OCR) tools or pattern recognition techniques are not enough to meet the challenges in general applications of text extraction. Because the text images are sometimes captured under extreme circumstances, sometimes the images will be noisy, or incomplete due to damages to the printing material, or obscured by marks or stamps. Pattern recognition is extremely difficult, if not impossible, when the image is partially shaded or partially missing. However, such tasks are not too difficult for humans as we predict the missing information based on its context. Most human cognitive processes involve two interleaved steps, perception and prediction. Together, they provide higher accuracy.

OBJECTS AND SUMMARY OF THE INVENTION

Work in cognitive computing has resulted in many computing models with different mathematical methods and application fields. In one category, computing models have been developed for performing cognitive functions on raw input signals such as image and audio. One representative area in this category is the associative neural network model, which is typically used for pattern recognition. We generally say that this kind of model performs the "perception" function. In the other category, models and algorithms are researched to operate on the concept-level objects, assuming that they have already been "recognized" or extracted from raw inputs. The present invention's cogent confabulation model was used for sentence completion. Trained using a large amount of literatures, the confabulation algorithm has demonstrated the capability of completing a sentence (given a few starting words) based on conditional probabilities among the words and phrases. We refer to these algorithms as the "prediction" models.

The present invention provides a method and a system of using a unified perception-prediction framework that combines the algorithms of neural networks and confabulation. The system uses neural network models for pattern recognition from raw input signal, and confabulation models for abstract-level recognition and prediction functionalities. At the lower (character) level (see FIG. 1, 110), the method applies the Brain-State-in-a-Box (BSB) neural network models for character recognition from the raw image. At the middle (word) level (see FIG. 1, 120), it adopts a new confabulation model for combining the character recognition results to form words and predicting characters. At the higher (sentence) level (see FIG. 1, 130), another confabulation model is used to form meaningful sentences and predict words.

The present invention yields significantly better results than other methods to improve the robustness and accuracy of text recognition. It combines intelligent text recognition with the capability of making intelligent predictions as to the word and sentence contexts.

It is therefore an object of the present invention to provide a context-based method for text recognition.

It is a further object of the present invention to apply word and sentence knowledge bases to aid in the process of text recognition.

It is yet a further object of the present invention to apply artificial intelligence through neural networks to aid in the process of context-based text recognition.

Briefly stated, the present invention achieves these and other objects by employing two neuromorphic computing models, auto-associative neural network and cogent confabulation. The neural network model performs the character recognition from input image and produces one or more candidates for each character in the text image input. The confabulation models perform the context-aware text recognition and completion, based on the character recognition outputs and the word and sentence knowledge bases.

The above, and other objects, features and advantages of the present invention will become apparent from the following description read in conjunction with the accompanying drawings, in which like reference numerals designate the same elements.

DETAILED DESCRIPTION OF THE PREFERRED EMBODIMENT

System Architecture

The present invention provides a method and a system in context-aware text recognition that mimics the human information processing procedure. The system learns from what has been read and, based on the obtained knowledge, it forms anticipations and predicts the next input image (or the missing part of the current image). Such anticipation helps the system to deal with all kinds of noise that may occur during recognition.

Figure 1:
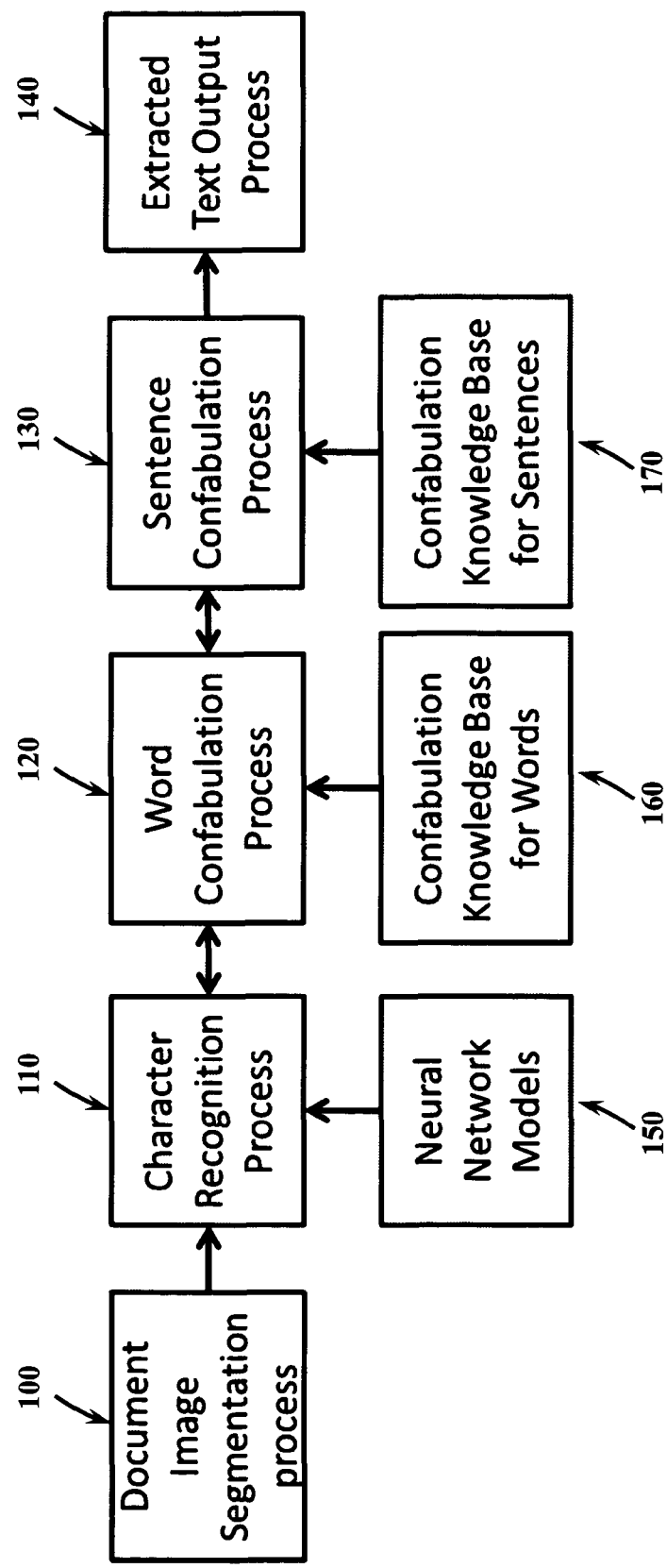
FIG. 1 depicts the process steps implemented by the present invention.

Referring to FIG. 1, the present invention is divided into three main layers. The input of the system is the text image 100. The first layer is a character recognition process based on neural network models 110. It tries to recall the input image with a stored image of the English alphabet. In this process, a race model is adopted 150. The model assumes that the convergence speed of the neural network recall algorithm indicates the similarity between patterns. For a given input image, the system considers all patterns that converge within certain number of iterations as potential candidates that may match the input image. All potential candidates will be reported as the neural network recall results. Using the racing model, if there is noise in the image or this image is partially damaged; multiple matching patterns will be found. For example, a horizontal scratch will make the letter "T" look like the letter "F". In this case we have ambiguous information.

The ambiguity is then removed by considering the word level and sentence level context, which is achieved in the second 120 and third layer 130 where word 160 and sentence 170 recognitions are performed using cogent confabulation models. The models fill in the missing characters in a word and missing words in a sentence. The three layers work cooperatively. The neural network layer 110, 150 performs the character recognition and it sends the potential letter candidates to the word level confabulation 120, 160. The word confabulation process forms possible word candidates based on those letter candidates and sends this information to the sentence confabulation layer 130, 170. There are feedback paths that send the sentence level confabulation results back 140 to word level 120, 160 or send word confabulation results back to character level 110, 150.

Front End Image Processing

Still referring to FIG. 1, the document image is first processed (i.e., segmented) 100 to separate into blocks of smaller images that contain only one character. The image processing function distinguishes punctuations from texts and uses them to separate sentences. It also separates words based on white spaces. The output of the image processing function is a set of character images labeled by a triplet (i, j, k), where k is the position of the character in a word, j is the position of this word in a sentence, and i is the index of the sentence that the character belongs to.

Character Level Image Perception

The output of the image processing function 100 is the input of the neural network model based character recognition process 110. The Brain-State-in-a-Box model 150 is a simple, non-linear, auto associative neural network. Human memory is said to be associative; that is, one event is linked to another event. Given a vague, partially formed idea or input, an associative memory will compare it against all other stored content until a match is found. In this context, a match refers to the resolution, completion, or connection of the full version, result, or 'answer' based upon the partial input located within memory. The BSB algorithm mimics this auto-associative behavior in that prototype patterns are stored as vectors in the neural network and are recalled when a 'noisy' or incomplete version of the pattern is presented to the system.

Figure 2:
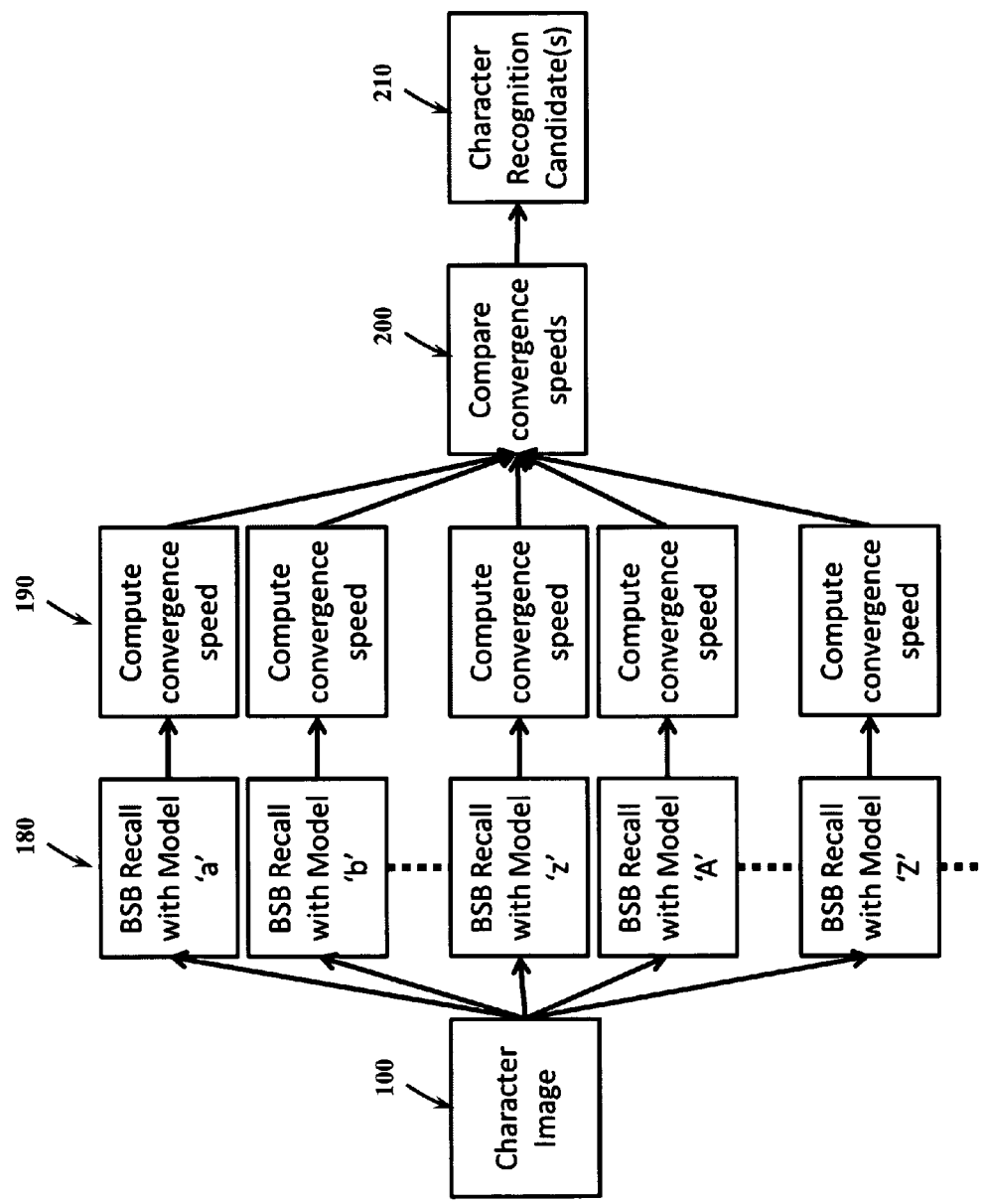
FIG. 2 depicts the process steps associated specifically with the character recognition performed by the present invention.

Referring to FIG. 2, the BSB model is used for character recognition within the system. A work flow chart of the BSB recall procedure is shown. Characters in the system are represented by pixel patterns. The system is trained with a character set and when a letter image is presented to the BSB algorithm, it is compared against all models in the system. This comparison is called the 'recall' stage 180. The 'winning' candidate characters 210 are those that converge the fastest 190, 200, or match, the closest to the images trained in the system. More than one character can be sent to the word level confabulation algorithm as a candidate, if multiple letters have the same degree of similarity to the input pattern. For particularly damaged characters, all letters in the alphabet can be considered candidates.

Confabulation-Based Word Level Prediction

Referring again to FIG. 1, the inputs of word confabulation 120 are characters with ambiguities referred as candidates. For each input image, one or multiple character recognition candidates will be generated by the BSB model.

Figure 3:
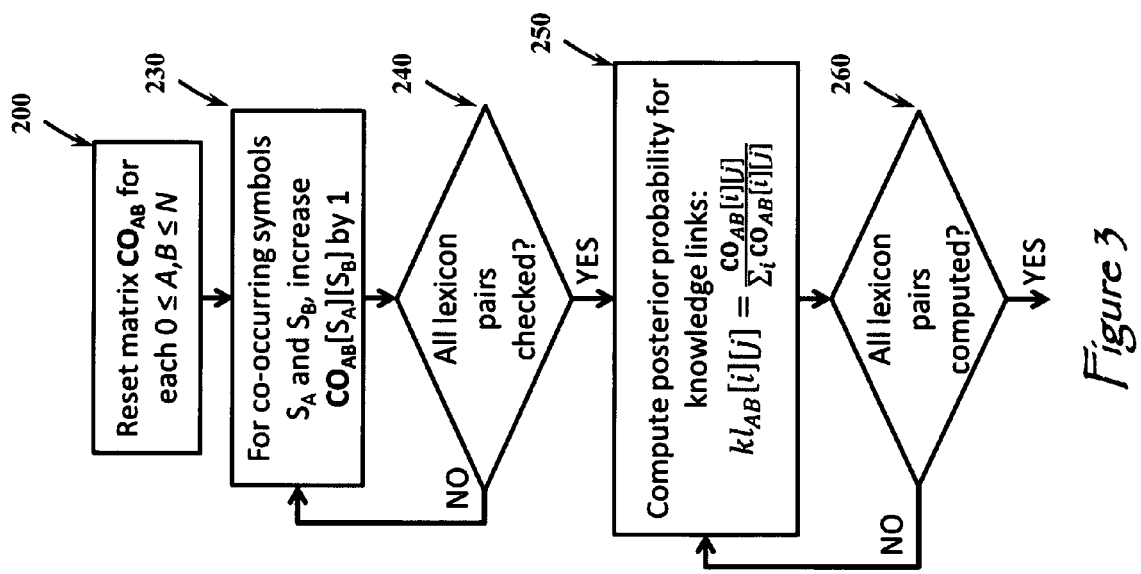
FIG. 3 depicts the process steps performed by the present invention associated specifically with the construction of a knowledge base.

Referring now to FIG. 3, the word confabulation model consists of three levels of lexicon units (LUs). The ith LU in the first level represents the ith character in the word. The ith LU in the second level represents a pair of adjacent characters at location i and i+1. The ith LU in the third level represents a pair of characters located at i and i+2.

A knowledge link (KL) 250 from lexicon A to B is a M×N matrix, where M and N are the cardinalities of symbol sets $S_A$ and $S_B$ 230. The ijth entry of the knowledge link 250 gives the conditional probability $P(i|j)$, where $i \in S_A$, and $j \in S_B$. Symbols i and j are referred to as source symbol and target symbol. Between any two LUs, there is a knowledge link (KL). If we consider the lexicons as vertices and knowledge links as directed edges between the vertices, then they form a complete graph.

Still referring to FIG. 3, depicting the construction of a knowledge base, confabulation-based word level and sentence level recognition heavily relies on the quality of the knowledge base (KB) (see FIG. 1, 160, 170). The training of the KB is the procedure to construct the probability matrix between source symbols and target symbols. First the process scans through the training corpus and counts the number of co-occurrences of symbols in different lexicons. Then for each symbol pair it calculates their posterior probability.

The word level recall algorithm finds all words from possible combinations of input character candidates. For example, if the input candidates of a 3-letter word are: (w t s r p o k e c a) for the first letter, (h) for the second letter, and (y t s r o m i h e a) for the third letter, then the word level confabulation process will find 24 words, including "why", "who", "wha", "thy" "thi", "the", "tha", "shy", "sho", "she", "rho", "phr", "ohs", "oho", "ohm", "kho", "eht", "cha", "aht", "ahs", "ahr", "ahm", "ahh", and "aha". Note that some of these words are not dictionary words, as it is the nature of a confabulation model to "make up" some new combinations that seem to be reasonable according to its knowledge base.

Figure 4:
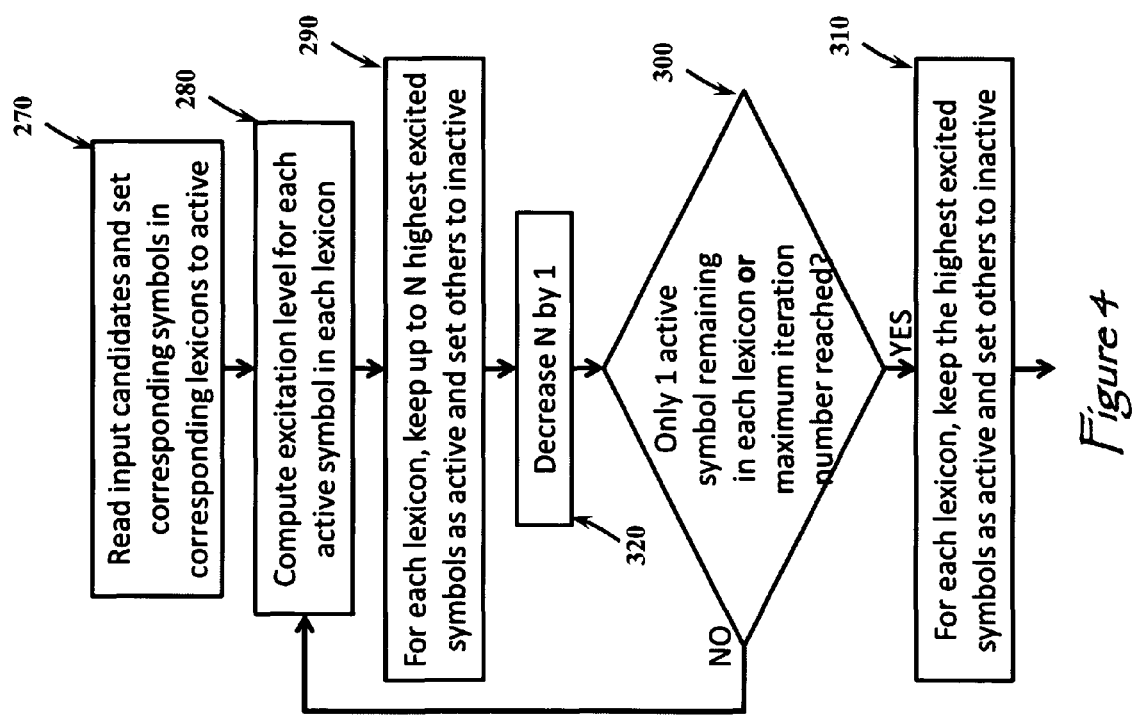
FIG. 4 depicts the process steps performed by the present invention associated with the computation of symbol excitation level and the determination of that active state of lexicons.

Referring to FIG. 4 gives the word or sentence recall work flow. For each input candidate in each lexicon, the process sets the corresponding symbols to active 270. A lexicon that has multiple symbols activated is referred to as an ambiguous lexicon and the goal of the word confabulation is to eliminate such character level ambiguity as much as possible or to transform it into word level ambiguity which can be further eliminated by the sentence level confabulation.

For each lexicon that has multiple symbols activated, we calculate the excitation level of each activated symbol 280. The excitation level of a symbol i in lexicon B is defined as:

$$EL_R[i]=\Sigma_{A \neq B}\Sigma_{j\in\{active\ symbols\ in\ A\}} kl_{AR}[j][i]$$

where, $kl_{AB}[j][i]$ is the knowledge link value from symbol j in lexicon A to symbol i in lexicon B. The N highest excited symbols in this lexicon are kept active 290. These symbols will further excite the symbols in other ambiguous lexicons. This procedure will continue 320 until the activated symbols in all lexicons do not change anymore 300. If convergence cannot be reached after a given number of iterations, then we will force the procedure to converge.

Confabulation-Based Sentence Level Prediction

For each word in a sentence, the word level confabulation process (see FIG. 1, 120) generates one or multiple word candidates. They will be input to the sentence level confabulation process.

The sentence level confabulation (see FIG. 1, 130) is very similar to its word level counterpart except that there are only two levels of LUs. The first level LUs represent single words while the second level LUs represent adjacent word pairs. The training and recall functions of sentence confabulation have the same principle as these functions at word level. However, it is important to point out that for each word level lexicon there are at most 26 candidates while the number of possible candidates for a sentence level lexicon is much higher. This makes the sentence level knowledge base extremely large and to locate an entry in the knowledge base is very time consuming. Two level hash functions are used to speed up the training and recall of the sentence level confabulation model.

Having described preferred embodiments of the invention with reference to the accompanying drawings, it is to be understood that the invention is not limited to those precise embodiments, and that various changes and modifications may be affected therein by one skilled in the art without departing from the scope or spirit of the invention as defined in the appended claims.

What is claimed is:

1. A method for context-aware text recognition, comprising the steps of:
    segmenting a document into digitized images that contain a single character;
    inputting said raw digitized images to a neural network to produce at least one recognized character;
    inputting said at least one recognized character to a first confabulation model to
    predict characters;
    produce words; and
    feedback said words to said step of inputting said raw digitized images;
    wherein said first confabulation model cooperates with a corresponding confabulation knowledgebase.

2. The method of claim 1, wherein said step of inputting said raw digitized images further comprises
    recalling said input digitized images with a stored alphabet character;
    computing the convergence speed of said neural network;
    considering all said digitized images that converge within a certain number of iterations as potential matches; and
    selecting character recognition candidates.

3. The method of claim 1, wherein method for context-aware text recognition further comprises the steps of:
    inputting a plurality of said words to a second confabulation model to
    predict words;
    produce sentences; and
    feedback said sentences to said step of inputting said at least one recognized character;
    wherein said second confabulation model cooperates with a corresponding confabulation knowledgebase.

4. The method of claim 3, further comprising the step of outputting a label (i, j, k) associated with each of said at least one recognized character, wherein
    k is the position of said character in said word;
    j is the position of said word in said sentence; and
    i is the index of the sentence that said character belongs to.

5. The method of claim 2, wherein said step of inputting said raw digitized images further comprises a prior step of training said neural network with a character set.

6. The method of claim 1, wherein said first confabulation model comprises two levels of lexicon units, wherein
    a first lexicon unit level represents a said recognized character at location i in each of said words; and
    a second lexicon unit level represents a pair of adjacent said recognized character at location i and i+1 respectively in each of said words.

7. The method of claim 6, wherein between said lexicons there is a knowledge link comprising an M×N matrix where
    $S_A$ is a set of cardinalities of symbols associated with the first of said any two lexicon; and
    $S_B$ is a set of cardinalities of symbols associated with the second of said any two lexicon.

8. The method of claim 7, wherein a ijth entry of said knowledge link gives the condition probability P(i/j) where
    $i \in S_A$;
    $j \in S_B$;
    where i is a source symbol and j is a target symbol.

9. The method of claim 8, wherein training of said knowledgebase comprises constructing a probability matrix between said source and said target symbols.

10. The method of claim 8, wherein said training of said knowledgebase further comprises the steps of:
    resetting a source and target symbol co-occurrence matrix;
    checking lexicon pairs for co-occurrences of source and target symbols;
    incrementing a counter for each detection of a co-occurrence;
    determining whether all lexicon pairs are checked for co-occurrence and returning to said step of checking lexicon pairs if not;
    computing the posterior probability for each said lexicon according to:

$$kl_{AB[i][j]} = \frac{CO_{AB[i][j]}}{\sum_i CO_{AB[i][j]}}$$

where
    $kl_{AB[i][j]}$ is a posterior probability matrix;
    $CO_{AB[i][j]}$ is a co-occurrence matrix; and
    determining whether all lexicon pairs have been computed and returning to said step of computing the posterior probability if not.

11. The method of claim 10 wherein said step of producing words comprises the steps of:

reading input candidates in each lexicon;
setting corresponding symbols in corresponding lexicons to active;
computing an excitation level for each said active symbol in each said lexicon;
storing a quantity of N highest excited said symbols as active;
setting other symbols to inactive;
decreasing said quantity N by 1;
determining if either only 1 active symbol remains in each lexicon or a maximum number of iterations has been reached and returning to said step of computing an excitation level if not; and
storing the highest excited symbols in each said lexicon and setting all other to inactive.

12. The method of claim 11, wherein said excitation level of an active symbol is computed according to:

$$EL_B[i] = \Sigma_{A \to B} \Sigma_{j \in \{active\ symbols\ in\ A\}} kl_{AB}[j][i]$$

where
$kl_{AB[i][j]}$ is the knowledge link value posterior probability matrix from symbol j in lexicon A to symbol i in lexicon B.

13. The method of claim 5 wherein said neural network is a Brain-In-a Box (BSB) neural network model.

14. The method of claim 13, wherein said step of training generates one Brain-State-In-a-Box (BSB) model for each possible said character.

15. The Method of claim 11, wherein said first confabulation model employs said lexicons and said knowledge links to capture the associations of said characters in different positions of a word.

16. The Method of claim 11, wherein said second confabulation model employs said lexicons and said knowledge link to capture the associations of said words in different positions of a sentence.

* * * * *